(12) United States Patent
Yang et al.

(10) Patent No.: US 6,995,991 B1
(45) Date of Patent: Feb. 7, 2006

(54) PWM CONTROLLER FOR SYNCHRONOUS RECTIFIER OF FLYBACK POWER CONVERTER

(75) Inventors: Ta-yung Yang, Milpitas, CA (US); Jun-Jie Kuo, Kaohsiung (TW); Tso Min Chen, Taichung (TW)

(73) Assignee: System General Corp., Taipei Hsien (TW)

( * ) Notice: Subject to any disclaimer, the term of this patent is extended or adjusted under 35 U.S.C. 154(b) by 0 days.

(21) Appl. No.: 10/896,103

(22) Filed: Jul. 20, 2004

(51) Int. Cl.
*H02M 3/335* (2006.01)

(52) U.S. Cl. .............................. 363/21.14; 363/21.18

(58) Field of Classification Search ............ 363/21.14, 363/21.12, 21.13, 21.18

See application file for complete search history.

(56) References Cited

U.S. PATENT DOCUMENTS 5,608,613 A * 3/1997 Jansen ..................... 363/21.03

* cited by examiner

*Primary Examiner*—Shawn Riley
(74) *Attorney, Agent, or Firm*—J.C. Patents (57) ABSTRACT

A synchronous rectifier PWM (SR-PWM) controller controls a MOSFET in response to the value of a secondary current and the status of a synchronous signal for both discontinuous and continuous operation mode. The secondary current is generated in a secondary circuit and is detected by two threshold-detection terminals of the SR-PWM controller. The SR-PWM controller produces the synchronous signal by detecting a switching signal of the transformer via a detection terminal of the SR-PWM controller. Furthermore, a delay-time is inserted after the MOSFET is turned off and before the next switching cycle starts to ensure a proper operation of the MOSFET. In one embodiment, an equivalent series resistance (ESR) of an output capacitor can be used as a sensor to detect the secondary current. Therefore, no additional current sensor is required.

7 Claims, 5 Drawing Sheets

PWM CONTROLLER FOR SYNCHRONOUS RECTIFIER OF FLYBACK POWER CONVERTER

BACKGROUND OF THE INVENTION

1. Filed of the Invention

The present invention relates to a pulse width modulation (PWM) controller of flyback power converter, and more particularly, to a synchronous rectifier PWM controller (SR-PWM) for a flyback power converter to improve efficiency of power conversion.

2. Description of Related Art

Power converters have been frequently used for converting an unregulated power source to a constant voltage source. Among various power converters, flyback topology is the most common one. A transformer having a primary winding and a secondary winding is the major part of a flyback power converter. In application, the primary winding is connected to the unregulated power source, preferably a DC voltage source, and a switching device is connected to the primary winding to switch on and off the connection between the unregulated power source and the primary winding. A rectifying diode is typically connected to the secondary winding for rectifying the energy transferred from the primary winding into a DC voltage.

Figure 1:
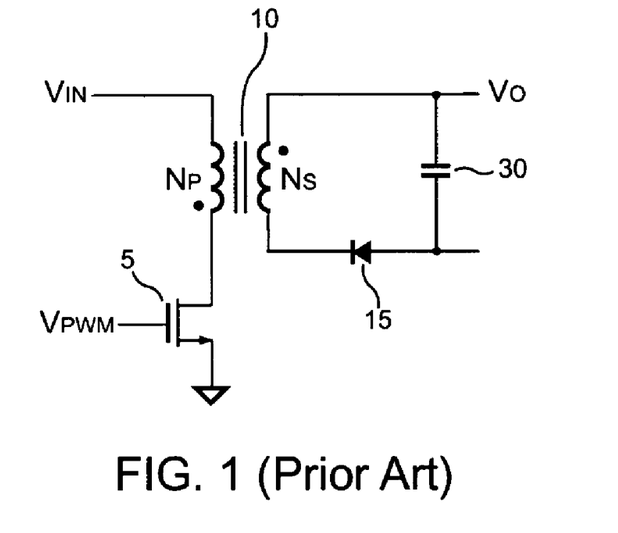
FIG. 1 is a schematic circuit diagram illustrating a conventional flyback power converter having a rectifying diode in a secondary circuit.

FIG. 1 shows a conventional flyback power converter. The flyback power converter includes a transformer 10 having a primary winding $N_P$ and a secondary winding $N_S$; a switching device 5 connected to the primary winding $N_P$ of the transformer 10; a rectifying diode 15 and an output capacitor 30 connected to the secondary winding $N_S$ of the transformer 10. The flyback power converter operates in a two-step cycle. In a first step, the switching device 5 is turned on to establish a connection between an input voltage source $V_{IN}$ and the primary winding $N_P$. Meanwhile, as the rectifying diode 15 is reverse biased, the conduction path via the secondary winding $N_S$ is cut off, and the primary winding $N_P$ operates as an inductor to store energy. In a second step, the switching device 5 is turned off, such that the primary winding $N_P$ is disconnected from the power source $V_{IN}$. Under such conditions, the energy stored in the transformer 10 is released through the secondary winding $N_S$, and is stored into the output capacitor 30.

In the topology as shown in FIG. 1, when the energy is released through the second winding $N_S$, a forward voltage drop across the rectifying diode 15 inevitably causes conduction loss and renders the rectifying diode 15 as the dominant loss component. To resolve the power loss problem, a MOSFET 20 having low on-resistance has been used to replace the rectifying diode 15 and provides synchronous rectification of the flyback power converter.

Figure 2:
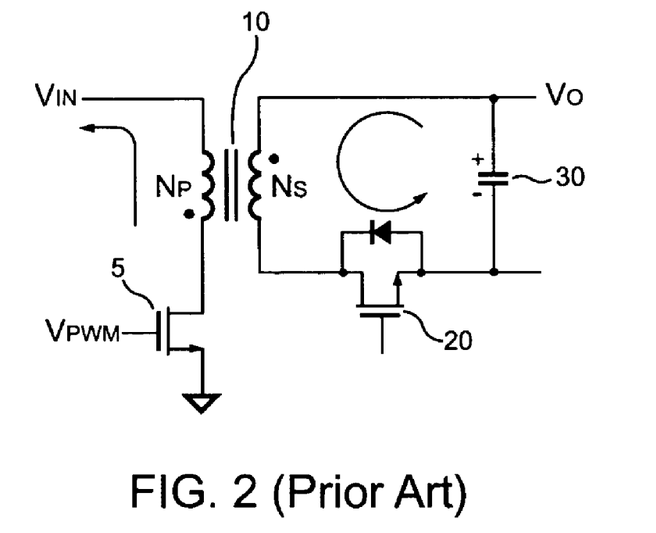
FIG. 2 is a schematic circuit diagram illustrating a second operation stage of switching instant for a conventional synchronous rectifier under the discontinuous mode.

FIG. 2 shows a conventional flyback power converter having a MOSFET synchronous rectifier (SR) 20. Similarly to the topology as shown in FIG. 1, the flyback power converter includes a transformer 10, a switching device 5 controlling conduction status between the primary winding $N_P$ of the transformer 10 and an input voltage source $V_{IN}$, and an output capacitor 30 connected to the secondary winding Ns of the transformer 10. Unlike the topology as shown in FIG. 1, the flyback power converter as shown in FIG. 2 includes the MOSFET synchronous rectifier 20 for reducing the rectifying loss.

A flyback power converter normally has two operation modes, i.e. discontinuous operation mode and continuous operation mode. In the discontinuous operation mode, all the energy stored in the transformer is completely delivered before the next cycle starts. Therefore, no inducted voltage will remain in the transformer to resist the output capacitor discharging back to the transformer. As shown in FIG. 2, when the flyback power converter operates under the discontinuous operation mode, at the switching instant that the energy of the transformer 10 is completely delivered, a reverse current will be discharged from the output capacitor 30.

In a first operation phase, the switching device 5 is turned on to conduct the input voltage source $V_{IN}$ to the primary winding $N_P$, and energy is stored to the transformer 10. The energy $\epsilon$ stored in the transformer 10 can be expressed as:

$$\epsilon = L_P \times I_P^2 / 2,$$

where $L_P$ is the inductance of the primary winding $N_P$, and $I_P$ is the current flowing through the primary winding $N_P$. In the discontinuous mode, $I_P$ can be expressed by:

$$I_P = V_{IN} \times T_{ON} / L_P,$$

where $T_{ON}$ is the duration when the switching device 5 is turned on. Therefore, the energy $\epsilon$ can be expressed as:

$$\epsilon = V_{IN}^2 \times T_{ON}^2 / 2L_P.$$

In a second operation phase, the connection between the primary winding $N_P$ of the transformer 10 and the input voltage source $V_{IN}$ will be cut off and the energy stored in the transformer 10 will be freewheeled to the output capacitor 30. The flyback power converter operates in the discontinuous mode under light load conditions, under which the energy stored in the transformer 10 is completely released before the next switching cycle starts. By completely releasing the energy stored in the transformer 10, no inducted voltage will remain in the transformer 10 to resist the output capacitor 30 discharging back to the transformer 10. Therefore, at the instant that the switching device 5 is turned off, a current will be discharged from the output capacitor 30 in a reverse direction once the energy stored in the transformer 10 is completely released.

Figure 3:
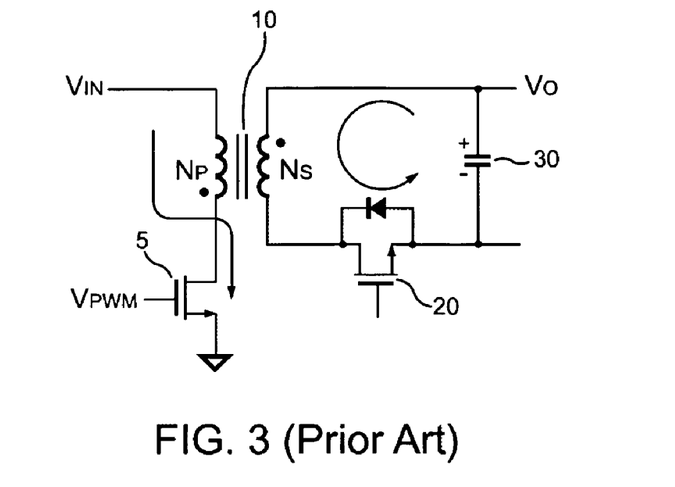
FIG. 3 is a schematic circuit diagram illustrating a first operation stage of switching instant for a conventional synchronous rectifier under the continuous mode.

In contrast, in the continuous operation mode, some energy remains in the transformer 10; that is, before the current released from the secondary winding Ns drops to zero, the next switching cycle will start. When the MOSFET synchronous rectifier 20 is switched off after the start of the next switching cycle, as shown in FIG. 3, a reverse charging operation of the output capacitor 30 may occur. More specifically, in the continuous mode, the energy $\epsilon$ stored in the transformer 10 can be expressed as:

$$\epsilon = [V_{IN}^2 \times T_{ON}^2 / (2 \times L_P)] + [I_a \times V_{IN} \times T_{ON} / T],$$

where $I_a$ is a current representing the energy that still exists in the transformer 10 when the next switching cycle starts; and T is the switching period of the flyback power converter.

Under the continuous mode operation, the transformer 10 keeps freewheeling the energy when the next switching cycle starts. If the MOSFET synchronous rectifier 20 is not switched off before the next switching cycle starts, the output capacitor 30 will be charged in a reverse direction.

Many approaches of synchronous rectification have been proposed to reduce rectifying loss, for example, U.S. Pat. No. 6,400,583, "Flyback converter with synchronous rectifying" issued to Chi-Sang Lau on Jun. 4, 2002 and U.S. Pat. No. 6,442,048, "Flyback converter with synchronous rectifying function" issued to Xiaodong Sun and John Xiaojian Zhao on Aug. 27, 2002.

However, in the disclosures mentioned above, the output capacitor is still sharply charged and discharged via the MOSFET synchronous rectifier at the switching instant in both continuous mode and discontinuous mode. Therefore, the efficiency is reduced and the noise is increased. Furthermore, in the above approaches, the transformer requires an additional auxiliary winding to generate a driving signal to achieve synchronous rectification; and thus increases the complexity thereof.

SUMMARY OF THE INVENTION

In the light of the above description, the present invention is deirected to a SR-PWM controller for a synchronous rectifier of a flyback power converter, including a detection terminal coupled to a secondary winding of a transformer via a detection diode for obtaining a detection signal, a first threshold-detection terminal and a second threshold-detection terminal for detecting a secondary current of the transformer, a timing terminal coupled to a programming resistor for determining a maximum pulse width of a single-pulse signal, an output terminal generating an synchronous signal to drive a MOSFET. The MOSFET operates as a synchronous rectifier. A drain of the MOSFET is connected to the secondary winding and a source of the MOSFET is connected to a secondary circuit of the flyback power converter. The secondary circuit includes an output capacitor, the MOSFET, and the SR-PWM controller. The output capacitor is connected across output terminal pairs of the secondary circuit. The output terminal of the SR-PWM controller drives a gate of the MOSFET to turn on/off the MOSFET in response to the value of the secondary current and the status of the synchronous signal. The secondary current generated in the secondary winding is detected via the first threshold-detection terminal and the second threshold-detection terminal. The synchronous signal is generated by detecting the switching signal of the transformer via the detection terminal of the SR-PWM controller.

The detection diode connected from the detection terminal of the SR-PWM controller to the drain of the MOSFET protects the SR-PWM controller from a high voltage input. The SR-PWM controller is operative to generate the single-pulse signal in response to a high state of the detection signal. The programming resistor connected to the timing terminal of the SR-PWM controller determines the maximum pulse width of the single-pulse signal. The single-pulse signal associates with the low state of the detection signal to generate the synchronous signal. The SR-PWM controller is operative to generate a delay-time in response to the single-pulse signal. The delay-time is inserted after the end of the single-pulse signal and before the next switching cycle starts. The next switching cycle starts at the rising edge of the detection signal. The delay-time ensures that the MOSFET is turned off before the next switching cycle starts whereas the SR-PWM controller is properly operated in the continuous operation mode.

In addition, the SR-PWM controller is operative to switch on the MOSFET only when the secondary current is larger than a threshold value. In this manner, the SR-PWM controller further includes a two constant current sources operative to generate the threshold value. When the secondary current is smaller than the threshold value in the discontinuous operation mode, the MOSFET will be switched off.

DETAILED DESCRIPTION OF EMBODIMENTS

Figure 4:
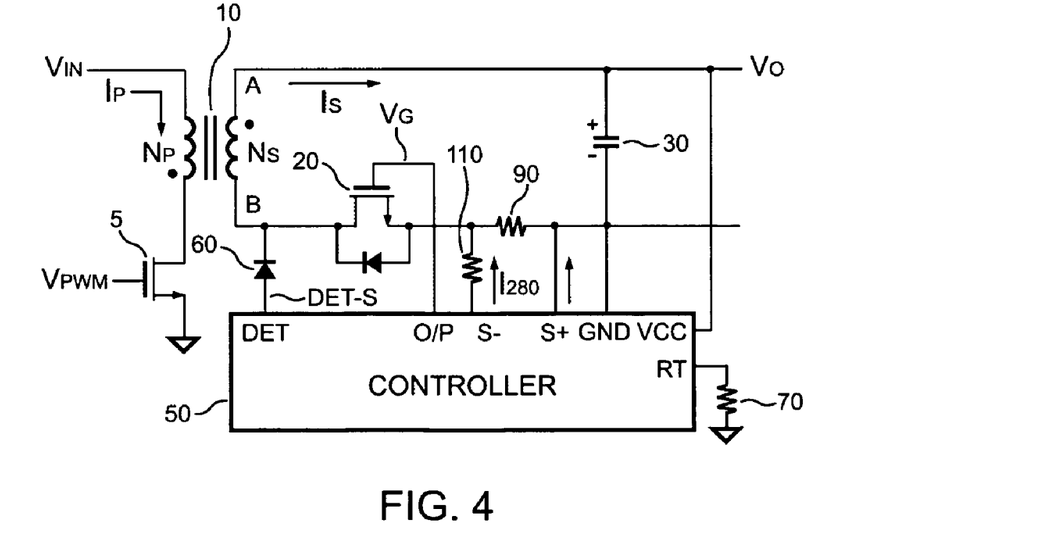
FIG. 4 is a schematic circuit diagram illustrating a Synchronous Rectifier PWM (SR-PWM) controller for controlling a synchronous rectifier in a flyback power converter according to an embodiment of the present invention.

Referring to FIG. 4, it illustrates a Synchronous Rectifier PWM (SR-PWM) controller 50 for a flyback power converter according to one embodiment of the present invention. In FIG. 4, the flyback power converter includes a transformer 10 having a primary winding $N_P$ coupled to a primary circuit and a secondary winding $N_S$ coupled to a secondary circuit. In the primary circuit, the primary winding $N_P$ is coupled between an input voltage source $V_{IN}$ and a switching device 5. The secondary circuit includes a MOSFET 20, an output capacitor 30, and the SR-PWM controller 50. A drain of the MOSFET 20 is connected to a terminal B of the secondary winding $N_S$. The output capacitor 30 is connected between a terminal A of the secondary winding $N_S$ and an output terminal of the secondary circuit. The SR-PWM controller 50 is coupled to the MOSFET 20. A resistor 90 serves as a current sensor, which is coupled between a source of the MOSFET 20 and a negative terminal of the output capacitor 30. The MOSFET 20 serves as a synchronous rectifier. The SR-PWM controller 50 used for controlling the MOSFET 20 includes a detection input DET coupled to an anode of a detection diode 60. A cathode of the detection diode 60 is coupled to the terminal B of the secondary winding $N_S$ of the transformer 10. The detection diode 60 is used for obtaining a detection signal DET-S. The SR-PWM controller 50 further includes a threshold-detection terminal S− and a threshold-detection terminal S+ for detecting a secondary current $I_S$ flowing through the secondary winding $N_S$. The SR-PWM controller 50 also includes a terminal RT, an output terminal O/P, a supply terminal VCC and a ground terminal GND. The output terminal O/P generates an output signal $V_G$ to drive a gate of the MOSFET 20. The terminal RT is connected to a programming resistor 70 to a ground reference level for determining the pulse width of a single-pulse signal $S_P$.

As shown in FIG. 4, the threshold-detection terminal S– is coupled to the resistor 90 through a resistor 110. The threshold-detection terminal S+ is coupled to the negative terminal of the output capacitor 30 and the ground terminal GND of the SR-PWM controller 50. An output voltage $V_O$ of the secondary circuit, which is also the output of the flyback power converter, is supplied to the supply terminal VCC of the SR-PWM controller 50.

Figure 5:
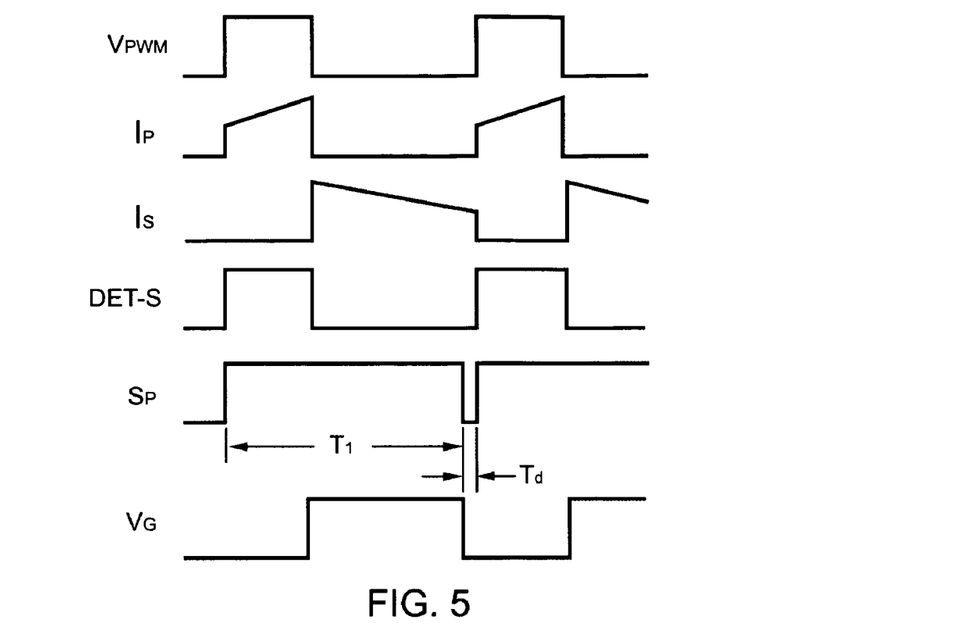
FIG. 5 is a schematic waveform diagram illustrating various signals generated in each switching cycle of the flyback power converter under a continuous operation mode according to one embodiment of the present invention.

Referring to FIG. 4 and FIG. 5, in a continuous operation mode, a switching signal $V_{PWM}$ turns on and off the switching device 5 in the primary circuit to generate a primary current $I_P$ flowing through the primary winding $N_P$. Energy will be stored to the transformer 10. The primary current $I_P$ is in phase with the switching signal $V_{PWM}$. Meanwhile, the detection diode 60 in the secondary circuit is reverse biased, and the detection signal DET-S is detected high via the detection diode 60 to enable the single-pulse signal $S_P$ of the SR-PWM controller 50.

As shown in FIG. 5, the detection signal DET-S is synchronous with the switching signal $V_{PWM}$. That is, when the switching signal $V_{PWM}$ becomes logic-high, the detection signal DET-S also becomes logic-high. In contrast, when the switching signal $V_{PWM}$ falls to logic-low, the detection signal DET-S is dropped to logic low. When the detection signal DET-S falls to logic low, the single-pulse signal $S_P$ remains logic-high. Meanwhile, the logic-low detection signal DET-S generates a logic-high signal to be coupled in an AND logic operation with the logic-high single-pulse signal $S_P$. A synchronous signal is generated via the output terminal O/P of the SR-PWM controller 50 to control to MOSFET 20. Therefore, the switching signal $V_{PWM}$ and the MOSFET 20 are synchronized. As shown in FIG. 4, the terminal RT of the SR-PWM controller 50 is connected to the programming resistor 70 for programming the pulse width of the single-pulse signal $S_P$ in response to the detection signal DET-S. For example, in this embodiment, the pulse width of the single-pulse signal $S_P$ is similar to the switching period of the flyback power converter.

Once the switching device 5 disconnects the conduction between the input voltage source $V_{IN}$ and the primary winding $N_P$, the primary current $I_P$ will be terminated and the secondary current $I_S$ will flow through the secondary winding $N_S$ to the secondary circuit. As a result, energy stored in the transformer 10 is delivered to the output terminal of the flyback power converter and the output capacitor 30 to be the output voltage $V_O$. The parasitic diode of the MOSFET 20 is forward biased. Since the parasitic diode of the MOSFET 20 is conducted, the detection signal DET-S will be detected low via the detection diode 60 and input to the SR-PWM controller 50. The logic-low detection signal DET-S will generate a logic-high signal to be coupled with the single-pulse signal $S_P$ again in an AND logic operation to generate the output signal $V_G$ to switch on the MOSFET 20.

Figure 6:
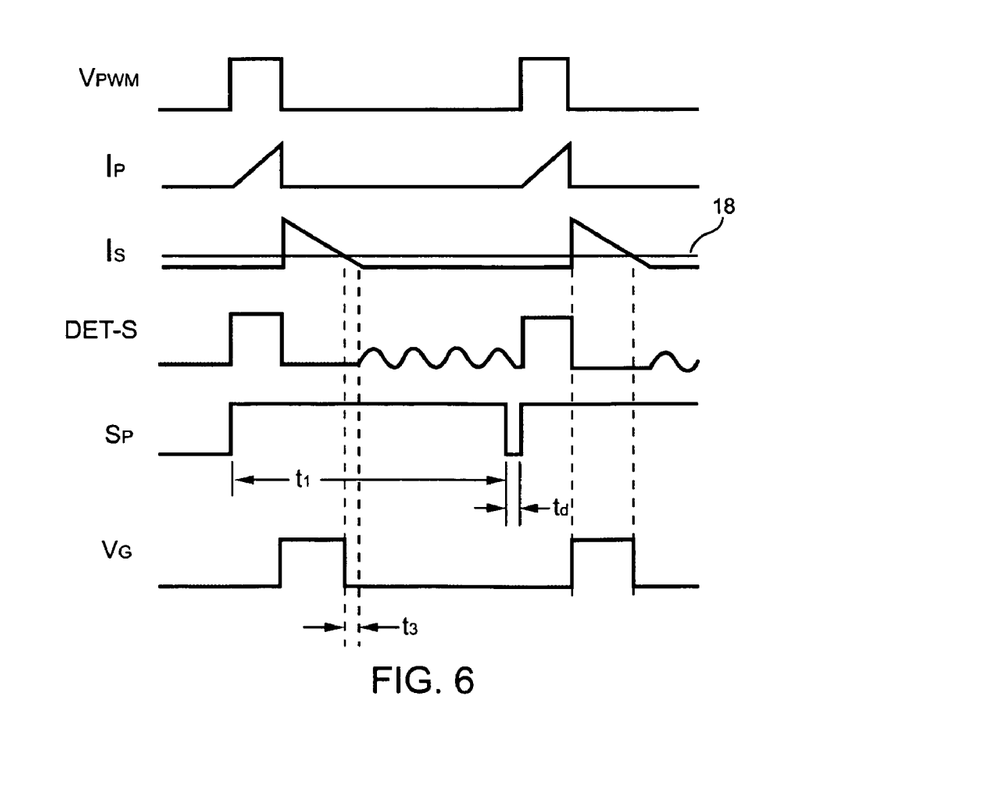
FIG. 6 is a schematic waveform diagram illustrating various signals generated in each switching cycle of the flyback power converter under a discontinuous operation mode according to one embodiment of the present invention.

In a discontinuous operation mode as shown in FIG. 6, threshold-detection terminals S– and S+ senses the secondary current $I_S$ generated in the secondary winding $N_S$ to control the MOSFET 20. FIG. 6 shows the waveforms of various signals generated in the discontinuous operation mode. Again, when the switching signal $V_{PWM}$ becomes high, the switching device 5 will be conducted and the primary current $I_P$ will be generated in the primary circuit to flow through the primary winding $N_P$. Meanwhile, the detection signal DET-S is detected high to enable the single-pulse signal $S_P$. When the switching signal $V_{PWM}$ drops to logic-low, the switching device 5 is turned off and the primary current $I_P$ is terminated. The detection signal DET-S drops to logic-low as well. Meanwhile, the secondary current $I_S$ is generated in the secondary circuit, and the energy stored in the transformer 10 is delivered to the output terminal of the flyback power converter and the output capacitor 30 to be the output voltage $V_O$. Before the next switching cycle starts, that is, before the switching signal $V_{PWM}$ becomes high again, the secondary current $I_S$ is reduced to zero. A constant current $I_{280}$ flows through the resistor 110 to set up a threshold value 18. The MOSFET 20 ia turned off as long as the secondary current $I_S$ is dropped to lower than the threshold value 18. As shown in FIG. 6, switching off the MOSFET 20 before the secondary current $I_S$ is dropped to zero can prevent a reverse discharge current from the output capacitor 30.

Figure 7:
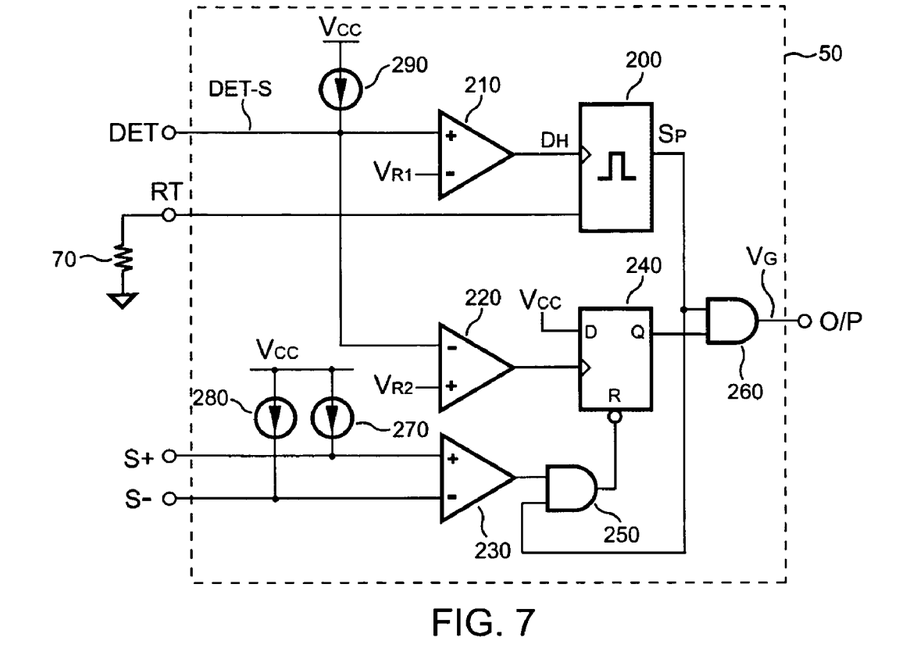
FIG. 7 is a schematic circuit diagram illustrating the SR-PWM controller as shown in FIG. 4 according to one embodiment of the present invention.

Referring to FIG. 7, the SR-PWM controller 50 is illustrated according to the present invention. As shown in FIG. 7, the SR-PWM controller 50 includes a current source 290, two constant current sources 270 and 280, three comparators 210, 220 and 230, a single-pulse generator 200, a D-type flip-flop 240, and AND gates 250 and 260. The current source 290 is supplied with a voltage source $V_{CC}$ for pulling up the detection input DET. In FIG. 7, the comparator 210 has a positive input supplied with the detection signal DET-S, a negative input supplied with a reference voltage $V_{R1}$, and an output coupled to the single-pulse generator 200. When the detection signal DET-S is higher than the reference voltage $V_{R1}$, the output of the comparator 210 will provide a signal $D_H$ to initiate the single-pulse generator 200 for generating the single-pulse signal $S_P$.

Further referring to FIG. 7, the comparator 220 has a negative input supplied with the detection signal DET-S, a positive input coupled to a reference voltage $V_{R2}$, and an output coupled to the D-type flip-flop 240. When the detection signal DET-S is lower than the reference voltage $V_{R2}$, the output of the comparator 220 enables an output of the D-type flip-flop 240 to become logic-high. The constant current sources 270 and 280 are respectively coupled to the threshold-detection terminal S+ and the threshold detector S– for generating the threshold value such as the threshold value 18 shown in FIG. 6. Connecting resistors from threshold-detection terminals S+ or S– to the ground terminal GND of SR-PWM controller 50 technically produces the threshold value. The comparator 230 senses the secondary current $I_S$ shown in FIG. 4 and compares the secondary current $I_S$ with the threshold value, so as to control the on/off status of the MOSFET 20. That is, when the secondary current $I_S$ is greater than the threshold value, an output of the comparator 230 generates a high-level signal output from the D-type flip-flop 240. The output of the D-type flip-flop 240 will then be coupled with the single-pulse signal $S_P$ in the AND gate 260 to generate an output signal $V_G$ operative to switch on the MOSFET 20. The AND gate 250 performing an AND operation on the single-pulse signal $S_P$ and the output of the comparator 230 is used to reset the D-type flip-flop 240.

Figure 8:
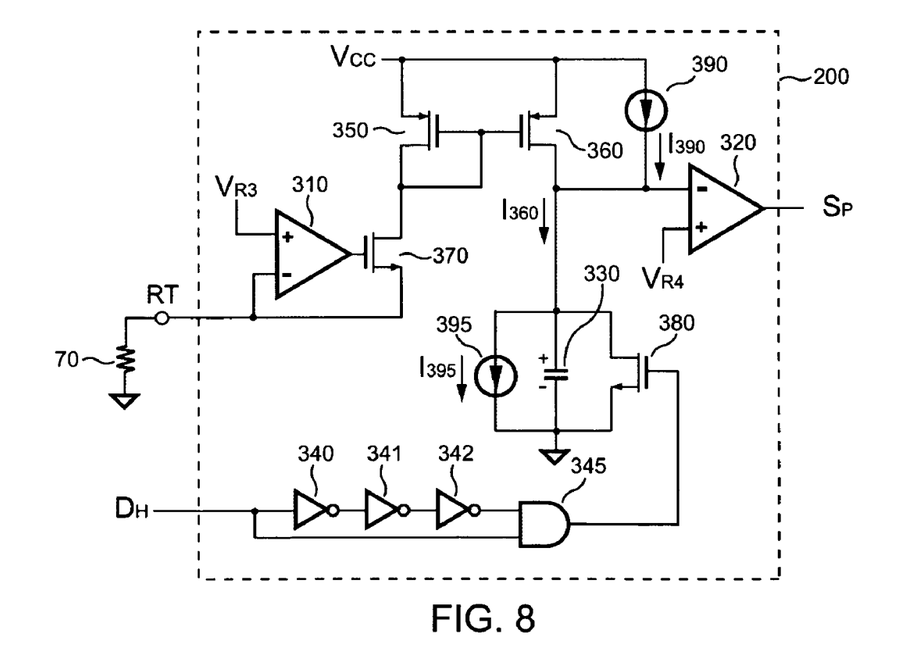
FIG. 8 is a schematic circuit diagram illustrating a single-pulse signal generator of the SR-PWM controller as shown in FIG. 7 according to one embodiment of the present invention.

Referring to FIG. 8, a schematic circuit diagram of the single-pulse generator 200 according to one embodiment of the present invention is illustrated. As shown in FIG. 8, the single-pulse generator 200 includes an operational amplifier 310, transistors 370, 350, 360, 380, programmable current sources 390 and 395, a capacitor 330, an AND gate 345, and inverters 340, 341 and 342. The operational amplifier 310 has a positive input supplied with a reference voltage $V_{R3}$, a negative input coupled to the terminal RT, and an output to drive the transistor 370. The transistor 370 is further connected to the terminal RT and a current mirror that is composed of mirrored transistors 350 and 360. The current mirror generates a charging current $I_{360}$, which can be expressed by:

$$I_{360}=(V_{R3}/R_{70})/(N_{360}/N_{350}),$$

where $N_{360}/N_{350}$ is the geometric ratio of the mirrored transistors 350 and 360, $R_{70}$ is the resistance of the programming resistor 70.

A reference voltage $V_{R4}$ supplied to the comparator 320 provides a threshold voltage for generating the single-pulse signal $S_P$. The capacitor 330 and the current $I_{360}$ are coupled to two programmable current sources 390 and 395. A single-pulse time $T_1$ for the single-pulse signal $S_P$ is determined as:

$$T_1=(C_{330}\times V_{R4})/(I_{360}+I_{390}-I_{395}),$$

where $C_{330}$ is the capacitance of the capacitor 330. Therefore, a delay time $T_d$ for starting the next switching cycle can be expressed as:

$$T_d=T-T_1,$$

where T is the period of the switching signal $V_{PWM}$.

When the transformer 10 is operated in continuous operation mode, the delay time $T_d$ ensures that the MOSFET 20 is turned off before the next switching cycle starts. This prevents a backward charging to the output capacitor 30 and protects the MOSFET 20 from over-stress switching. Therefore, a proper value of the delay time $T_d$ is significant for the synchronous rectifying. A wider delay is needed for the switching; however, a shorter delay can achieve higher efficiency.

The currents $I_{395}$ and $I_{390}$ generated by the programmable current sources 395 and 390 are developed as the function of delay time $T_d$ as shown in FIGS. 5, 6. More specifically, the delay time $T_d$ will be shortened when the current $I_{390}$ is decreased and the current $I_{395}$ is increased. On the contrary, the delay time $T_d$ is lengthened when the current $I_{390}$ is increased and the current $I_{395}$ is decreased. Once the switching frequency of the switching device 5 fluctuates due to temperature variation, degradation of components or other factors, foregoing control mechanism is used to optimize the delay time $T_d$.

Further referring to FIG. 8, the signal $D_H$ is delayed by the inverters 340, 341 and 342 before entering one input of the AND gate 345, while the signal $D_H$ is input to the other input of the AND gate 345. The AND gate 345 generates a discharge pulse to discharge the capacitor 330 in response to the rising edge of the detection signal DET-S, so as to initiate the next single-pulse signal.

Figure 9:
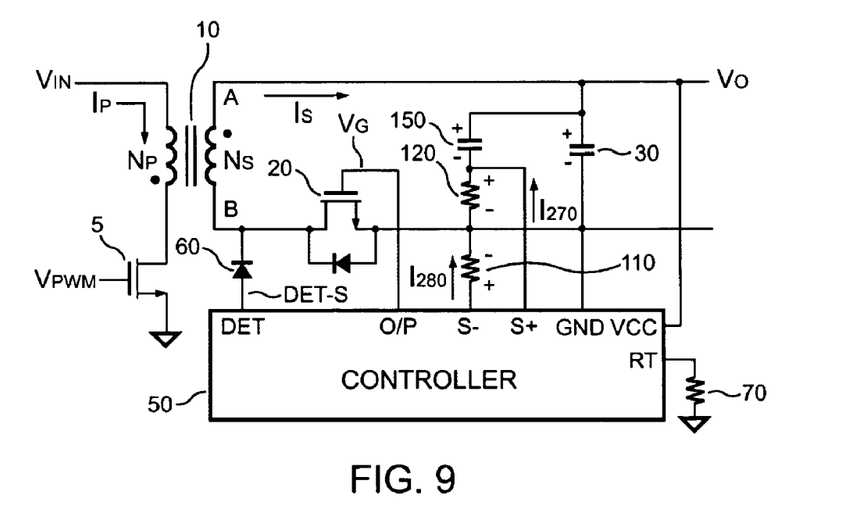
FIG. 9 is a schematic diagram illustrating a SR-PWM controller for control the synchronous rectifier in the flyback power converter according to an embodiment of the present invention.

Referring to FIG. 9, a flyback power converter using the SR-PWM controller 50 according to one embodiment of the present invention is illustrated. As shown in FIG. 9, the power converter includes a transformer 10 having a primary winding $N_P$ and a secondary winding $N_S$ respectively coupled to a primary circuit and a secondary circuit. In the primary circuit, a switching device 5 is used to control the connection between the primary winding $N_P$ and an input voltage source $V_{IN}$. In the secondary circuit, a drain of a MOSFET 20 is coupled to a terminal B of the secondary winding $N_S$. An output capacitor 30 is coupled between a terminal A of the secondary winding $N_S$ and an output terminal of the secondary circuit. In the flyback power converter as shown in FIG. 9, an equivalent series resistance (ESR) of the output capacitor 30 serves as a current sensor to detect a secondary current $I_S$ flowing via the secondary winding $N_S$. Therefore, no additional current sensor is required in this embodiment; and consequently, the efficiency is improved, and the cost is reduced. As shown in FIG. 9, a capacitor 150 and a resistor 120 are connected in series to be coupled to the output capacitor 30 in parallel for removing the DC portion of the voltage across the output capacitor 30. As a result, only the AC portion of the voltage in the output capacitor 30 is detected. The voltage across the resistor 120 coupled to a threshold-detection terminal S+ includes a threshold value generated by the constant current source 270 as shown in FIG. 7 and the AC portion of the voltage across the capacitor 30:

$$V_{120}=V_{DC}+\Delta V,$$

where $$V_{DC}=I_{270}\times R_{120}, \text{ and}$$

$$\Delta V=\Delta I_S \times R_{ESR}$$

A resistor 110 is coupled from a threshold-detection terminal S– to the ground terminal GND of the SR-PWM controller 50 for generating another threshold value. The MOSFET 20 is conducted only when the voltage $V_{120}$ across the resistor 120 is higher than the voltage of $I_{280}\times R_{110}$, wherein $R_{110}$ is the resistance of the resistor 110, and $I_{280}$ is the current of the constant current source 280 as shown in FIG. 7.

It will be apparent to those skilled in the art that various modifications and variations can be made to the structure of the present invention without departing from the scope or spirit of the present invention. In view of the foregoing, it is intended that the present invention cover modifications and variations of this invention provided that they fall within the scope of the following claims and their equivalents.

What is claimed is:

1. A pulse width modulation (PWM) controller for a synchronous rectifier of a flyback power converter, comprising:
    a detection terminal, coupled to a secondary winding of a transformer of the flyback power converter through a detection diode for producing a detection signal;
    a first threshold-detection terminal;
    a second threshold-detection terminal, wherein said first threshold-detection terminal and said second threshold-detection terminal are applied to detect a secondary current flowing through said secondary winding of said transformer of the flyback power converter;
    a timing terminal, coupled to a programming resistor for determining a maximum pulse width of a single-pulse signal, wherein said single-pulse signal raises to high in response to a high state of said detection signal, wherein a high state of said single-pulse signal associates with a low state of said detection signal for generating a synchronous signal;
    an output terminal, outputting said synchronous signal to drive a MOSFET, wherein said MOSFET operates as a synchronous rectifier, wherein said MOSFET is switched on/off in response to the value of said secondary current and the status of said synchronous signal, wherein said MOSFET is switched on only when said synchronous signal is active and said secondary current is larger than a first threshold value; and
    a supply terminal; and
    a ground terminal.

2. The PWM controller as recited in claim 1, wherein the PWM controller is operative to generate said single-pulse signal in response to said detection signal, wherein said single-pulse signal is coupled with a signal that is generated in response to said detection signal in an AND logic operation to generate said synchronous signal to turn on/off said MOSFET.

3. The PWM controller as recited in claim 1, wherein a delay-time is generated in response to said single-pulse signal, wherein said delay-time is inserted between an end of said single-pulse signal and a start of a next switching cycle to ensure that said MOSFET is turned off before the next switching cycle starts, wherein the next switching cycle starts at a rising edge of said detection signal.

4. The PWM controller as recited in claim 1 further comprising:
   a first comparator, having a positive input supplied with said detection signal, a negative input supplied with a first reference voltage and an output;
   a second comparator, having a negative input supplied with said detection signal, a positive input supplied with a second reference voltage and an output;
   a third comparator, having a positive input coupled to said first threshold-detection terminal, a negative input coupled to said second threshold-detection terminal and an output;
   a single-pulse generator, having a first input coupled to said output of said first comparator, a second input coupled to said timing terminal and an output;
   a first AND gate, having two inputs wired with said output of said third comparator and said output of said single-pulse generator and an output;
   a D-type flip-flop, having a clock input coupled to said output of said second comparator, a reset input coupled to said output of said first AND gate, and an output, wherein said D-type flip-flop further has a D-input supplied with a supply voltage;
   a second AND gate, having inputs coupled to said output of said single-pulse generator and said output of said D-type flip-flop;
   a first constant current source, coupled to said first threshold-detection terminal;
   a second constant current source, coupled to said second threshold-detection terminal, wherein said first constant current source and said second constant current source are used for generating said first threshold value; and
   a current source, coupled to said detection terminal for pulling up said detection signal.

5. The PWM controller as recited in claim 4, wherein said single-pulse generator further comprises:
   a V-to-I converter, comprising an operational amplifier and a plurality of transistors associated with said programming resistor to produce a constant charge current, wherein said programming resistor and a third reference voltage coupled to said operational amplifier determine said constant charge current;
   a programmable charge current source, generating a programmable charge current;
   a programmable discharge current source, generating a programmable discharge current;
   a capacitor, charged by said constant charge current and said programmable charge current, discharged by said programmable discharge current to produce a charging time for generating said single-pulse signal;
   an AND gate and a plurality of inverters, producing a discharge pulse for discharging said capacitor, wherein said discharge pulse is generated in response to the rising edge of said detection signal; and
   a comparator, providing a second threshold value for generating said single-pulse signal.

6. The PWM controller as recited in claim 5, wherein a pulse width of said single-pulse signal reduces when said programmable charge current increases, wherein the pulse width of said single-pulse signal increases when said programmable discharge current increases, wherein an optimized pulse width of said single-pulse signal is obtained by regulating said programmable charge current and said programmable discharge current.

7. The power converter as recited in claim 5, wherein said programmable charge current and said programmable discharge current are developed as a function of said delay-time, wherein said delay-time is shortened when said programmable charge current decreases and said programmable discharge current increases, wherein said delay-time is expanded when said programmable current increases and said programmable discharge current decreases.

* * * * *